2,873,243
MEANS FOR SHIELDING AND COOLING REACTORS

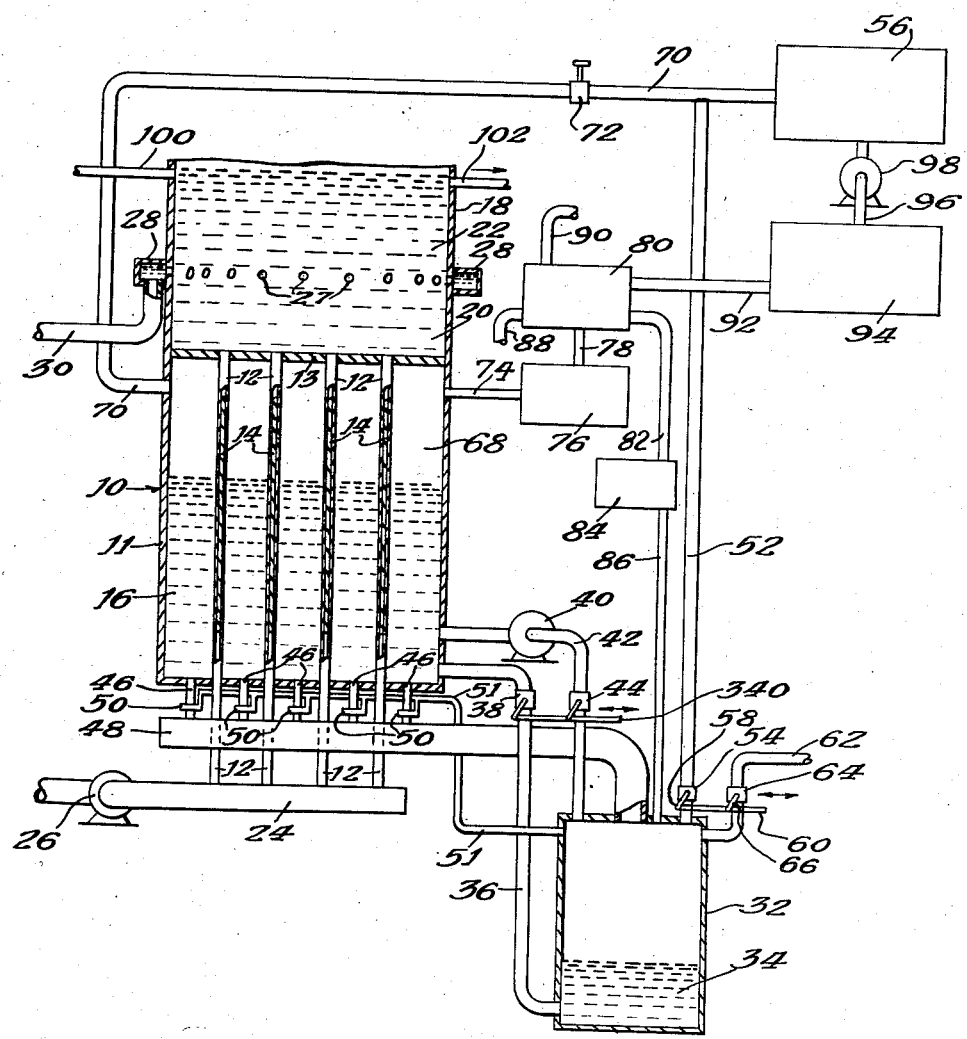

Eugene P. Wigner, Oak Ridge, Tenn., Leo A. Ohlinger, Chicago, Ill., and Gale J. Young and Alvin M. Weinberg, Oak Ridge, Tenn., assignors to the United States of America as represented by the United States Atomic Energy Commission Application October 8, 1946, Serial No. 701,910

3 Claims. (Cl. 204—193.2)

This invention relates to neutronic reactors, and, more particularly, to a novel method and means for shielding reactors to protect operating personnel from emanations such as neutrons, and alpha, beta, and gamma radiations. The instant application is a continuation-in-part of copending application, U. S. Serial No. 681,252, filed July 3, 1946, now patent No. 2,770,591, issued on November 13, 1956.

In neutronic reactors, a neutron fissionable isotope, such as $U^{233}$, $U^{235}$, or $94^{239}$, or mixtures thereof, is subjected to fission by absorption of neutrons, and a self-sustaining chain reaction is established by the neutrons evolved by the fission. In general such reactors comprise bodies of compositions containing such fissionable material, for example, natural uranium, disposed in a neutron slowing material which slows the neutrons to thermal energies. Such a slowing material is termed a neutron moderator. Carbon, beryllium, and $D_2O$ (heavy water) are typical moderators suitable for such use. Heat is evolved during the reaction which is removed by passage of a coolant through the reactor in heat exchange relationship therewith.

An object of the present invention is to provide a novel shield for use with a neutronic reactor, such as above described, said shield comprising a contained quantity of two immiscible hydrogeneous liquids of different specific gravity whereby the lighter liquid floats on the heavier liquid.

Another object of the invention is to provide a novel method and means for shielding a body of coolant after having passed through a neutronic reactor.

It may be noted that the term "hydrocarbon fluid," as used herein, is hereby broadly defined to include aromatic compounds as well as aliphatic compounds, both saturated and highly conjugated. Such a shield is advantageous in producing a minimum amount of explosive gas under neutron bombardment, and it has been discovered that ordinary straight chain hydrocarbons are effective and conjugated double-bond hydrocarbons are highly effective in reducing the production of explosive gases.

It may also be noted that the invention comprehends a radiation shield of highly polymerized aromatic or aliphatic compounds such as those produced by the bombardment of benzene, biphenyl and their compounds with high speed particles, such as electrons, deuterons or neutrons; and it will be understood that the neutron bombardment of a shielding fluid, such as biphenyl, associated with a neutronic reactor produces a highly polymerized compound which is particularly resistant to penetration by radioactive emanations from the nuclear fission chain reaction.

In addition other hydrocarbons may be used as a fluid shield including octane, isooctane, heptane, hexane, methane, ethylene, propylene, butylene, xylene, toluene, or the polymers or other products formed by bombardment of these compounds with neutrons, deuterons, or electrons.

The foregoing and other objects and advantages of the invention will become apparent from a consideration of the following specification and the drawing which is a flow diagram of a neutronic reaction system embodying the present invention.

Describing the invention in detail, and referring to a preferred embodiment thereof, illustrated in the drawing, the neutronic reactor 10 comprises a container or reaction tank 11 which is vertically pierced with a relatively large number of conduits or tubes 12 preferably of aluminum, only four of which are shown diagrammatically, said tubes enclosing natural uranium rods 14 preferably covered with a sealed protective aluminum jacket and being surrounded by heavy water 16 which serves as a neutron moderator.

A shield tank 18 is provided above the reactor 10 and contains a clear fluid such as water 20 immediately above the reactor, and a clear low volatility hydrocarbon liquid 22 floating on the water 20. The tubes 12 open through the reaction tank top 13 into the shield tank 18 and are supplied through the lower ends thereof from a cooling water supply header 24 into which cooling water may be forced by a pump 26 from a source of cooling water not shown. The cooling water introduced through the header 24 flows upwardly through the tubes 12, around the uranium rods 14, and into the shield tank 18 from which it is withdrawn through orifices 27 leading to a discharge header 28 surrounding the shield tank 18 and from which the discharge water may be withdrawn through a pipe line 30. A closed system for the water 20 may be employed if desired. The reaction tank 11 is only partially filled with the heavy water moderator 16 for purposes of controlling the neutronic reaction reproduction ratio within a range above and below unity as later described in greater detail, from a heavy water reservoir 32, the level of heavy water 34 in the reservoir being determined by the maximum requirement for heavy water in the reaction tank 11. More particularly, the heavy water reservoir may be maintained under pressure and the heavy water may be introduced to the reaction tank through a pipe line 36 under control of a valve 38. Excess heavy water may be pumped from the reaction tank 11 to the reservoir 32 by a pump 40 operating through a pipe line 42 and valve 44.

The effective size of the reactor 10 is determined by the quantity of heavy water in the reaction tank 11 and since an excessive quantity of heavy water in the reaction tank 11, over and above critical size conditions, may result in a rapid exponential rise in neutron density, means are provided for dumping the heavy water rapidly from the tank 11 in the form of a number of emergency pipe lines 46 connected between the bottom portion of the reaction tank 11 and a heavy water outlet header 48 leading to the heavy water reservoir 32. Each of the emergency pipe lines 46 is provided with a safety control valve 50 maintained in a closed position by gas pressure applied through pipe lines 51 from the heavy water reservoir 32. Such pressure is preferably maintained by helium gas introduced to the heavy water reservoir 32 through a pipe line 52 and valve 54 from a helium reservoir 56. During reactor operation, the valve 54 is maintained in an open position by a valve lever 58 connected to a control rod 60, and in the event that rapid dumping of the heavy water in the reaction tank 11 is desired, the helium pressure in the reservoir 32 may be reduced rapidly by opening the reservoir to the atmosphere through a line 62 by opening a valve 64 also operated by control rod 60. Release of pressure in the reservoir 32 likewise releases pressure in the pipe lines 51 connected to the dump valves 50 causing them to open and the heavy water moderator 16 to be dumped rapidly into the reservoir 32. Thus when one valve, such as the valve 64 is in a closed position the other, such as valve 54, is in an open position.

During operation, the reaction tank 11 is maintained only partially filled with the heavy water 16 leaving a space 68 above the heavy water for release of gases therefrom produced during operation of the reactor, although it is to be understood that during operation of the reactor the level of the heavy water 16 covers the uranium rods 14, the drawing for clarity showing a filling level of heavy water. For example, during operation of a neutronic reaction system utilizing a heavy water moderator, decomposition products, such as deuterium and oxygen, are formed from the heavy water. Such decomposition products are collected in the space 68 above the heavy water moderator and are diluted and swept from the reaction tank by a flow of helium introduced through a line 70 from the helium reservoir 56 as controlled by valve 72. The flow of helium over the heavy water entrains the gaseous decomposition products that are vented through an exhaust pipe line 74. Since the decomposition products are predominantly deuterium and oxygen these gases may be recombined in a recombination chamber 76 connected to the exhaust pipe line 74. The recombination chamber 76 may enclose a catalytic agent such as platinized charcoal maintained at an elevated temperature or a hot grid over which the gases are driven by the helium to be recombined into heavy water vapor. Such vapor is withdrawn from the chamber 76 through a pipe line 78 and led to a heavy water condenser 80 for condensation of the vapor, whereupon the condensed heavy water is returned to the reservoir 32 through a line 82, heavy water purifier 84, and line 86. The condenser 80 is cooled by a fluid medium such as water introduced thereto through inlet line 88, and withdrawn through an outlet 90. The helium is withdrawn from the condenser 80 through a line 92 leading to a helium purifier 94 where other gaseous products that may be formed in the reactor are removed, whereupon the helium is returned through a pipe line 96 and pump 98 to the helium reservoir 56.

In the operation of the system shown and so far described, the neutronic reaction within the reactor 10 develops considerable energy in the form of beta and gamma rays as well as kinetic energy from the fission products. A great portion of this energy is released within the tubes 12 extending vertically through the reaction tank 11 and is absorbed by the flow of water through these tubes around the uranium rods 14. However, some of the neutrons developed in the reactor, as well as high intensity gamma rays, escape therefrom and may result in a great health hazard to operating personnel. With the above-described arrangement of the water and hydrocarbon fluid in the shield tank 18, protection is offered for operating personnel above the neutronic reactor, although it is preferred to provide side shielding completely surrounding other surfaces of the reactor. Consequently, the reactor is placed between heavy side shields (not shown) so that operating personnel may approach the equipment for servicing purposes.

It will be noted from the above description that the upper face of the reactor can be opened to the atmosphere through the two superimposed liquid layers. These two layers can form the normal top shield during operation, and in addition provide a space wherein the uranium rods can be removed under the protection of the liquid if desired, although such removal is no part of the present invention. It is preferred also that the coolant be made to flow upwardly so that if a failure of the coolant supply occurs, the coolant can reverse its flow by gravity and drain out for a short time through the coolant tubes, thereby cooling the uranium rods for a critical period in which delayed neutrons are being emitted, after shutdown of the chain reaction has been initiated. However, the main feature of the present invention is that in case of failure of an aluminum jacket to maintain a seal, whereby uranium from the rods and/or radioactive fission products enter the coolant stream, the superimposed layer of hydrocarbon reduces the intense radioactivity introduced into the layer over the reactor, and permits removal of the offending rod by personnel shielded by the uncontaminated hydrocarbon layer. Thus, by the use of the hydrocarbon layer, a rod having a leaking jacket can be removed a short time after shutdown without having to wait for the radiation in the coolant layer to decay over a long period of time.

It will be understood that the above-described embodiment of the invention is diagrammatic and an operative reactor of this type may be constructed in accordance with the teachings of Figs. 2 and 3 and the accompanying specification of the above-mentioned copending application.

While the theory of nuclear reactions set forth herein is based on the best presently known experimental evidence, the invention is not limited thereto, inasmuch as additional experimental data later discovered may modify the theory disclosed.

Obviously, many modifications may be made in the specific embodiment disclosed without departing from the intended scope of the invention which is limited only by the appended claims.

What is claimed is:

1. In a system of the class described, means for sustaining a nuclear fission chain reaction comprising heavy water having vertical passages therethrough and thermal neutron fissionable material in said passages, a coolant flowing through said passages and into a container above the passages, and a hydrocarbon shielding fluid floating on the coolant above the passages.

2. The system of claim 1 in which the neutron moderator is heavy water, the fissionable material is uranium, the coolant is water, and the hydrocarbon shielding fluid is an aromatic hydrocarbon.

3. The system of claim 2 in which the aromatic is biphenyl.

References Cited in the file of this patent

FOREIGN PATENTS

| 861,390 | France | Oct. 28, 1940 |
| 233,011 | Switzerland | Oct. 2, 1944 |

OTHER REFERENCES

Deming: "General Chemistry," 3rd ed. p. 148 (1930), John Wiley & Sons.

Smyth: "Atomic Energy for Military Purposes," pp. 103, 104, August 1945. (Copy may be purchased from Supt. of Documents, Washington 25, D. C.)

Kelly et al.: Phy. Rev. 73, 1135–9 (1948).